Patented July 31, 1951

2,562,440

UNITED STATES PATENT OFFICE 2,562,440

PROCESS FOR PREPARING STABLE EMULSIONS OF THERMOPLASTIC SYNTHETIC POLYMERS

Johann Josef Peter Staudinger, Ewell, and Desmond Cleverdon, Bournemouth, England, assignors to The Distillers Company, Limited, Edinburgh, Scotland, a British company No Drawing. Application October 29, 1946, Serial No. 706,507. In Great Britain October 31, 1945

5 Claims. (Cl. 260—29.6)

This invention is for improvements in or relating to the manufacture of stable emulsions of thermo-plastic synthetic polymers, for example polyvinyl esters, such as polyvinyl acetate, and polyacrylic esters, such as polymethyl acrylate.

Emusions of thermo-plastic synthetic polymers are extensively used as bonding, laminating and coating media and much is already known in the art of their preparation. For example, it is already known that monomeric vinyl or acrylic esters may be emulsified in an aqueous medium, consisting of a dilute solution of an ordinary soap; the use of soaps of the naphthalene sulphonic acids or of sulphonated castor oil as emulsifying agents has also been disclosed. The use of partial or complete hydrolysis products of polyvinyl esters or the alkali salts of polyacrylic and polymethacrylic acids have also been disclosed for the preparation of aqueous emulsions.

These prior processes suffer from certain disadvantages; thus the emulsions may be unstable or else stability can be achieved only by the use of excessively large concentrations of these emulsifying agents. Some of the agents contaminate the polymer and impart to it an objectionable colour. To overcome these disadvantages, certain proposals have already been made as, for example, in British Patent No. 568,884, wherein it has been proposed to use, in the aqueous phase, a complex emulsifying system consisting of a surface-tension reducer and at least two hydrophilic organic colloids, such as gum tragacanth, starch, water-soluble cellulose ethers and the like. The use of hydrophilic organic colloids has, however, the disadvantage that the films deposited from such emulsions still contain these hydrophilic colloids and consequently their adhesion to the supporting surface is materially reduced, particularly under conditions of high humidity. In addition, the electrical properties of the films are adversely affected by the presence of these hydrophilic colloids.

We have now found that these disadvantages can be overcome by the use of a novel combination of agents, capable of giving emulsions stable during and after polymerisation, and having desirable characteristics in the highest degree. It is, therefore, one object of the present invention to produce thermo-plastic synthetic polymer emulsions which are freely-flowing, have a high dry solid content and are stable on prolonged storage. Another object of our invention is to produce thermo-plastic synthetic polymer emulsions which, when left aside to evaporate, yield a continuous, tough and adherent film with a very low degree of opacity and which are free from hydrophilic colloids and thus free from the defects mentioned above.

According to the present invention there is provided a process for the production of stable thermo-plastic synthetic polymer emulsions which comprises dispersing the monomeric substance or substances to be polymerised in an aqueous medium containing a stabiliser consisting of one or more fatty alcohols containing 10 to 20 carbon atoms in the molecule, an emulsifying agent consisting of an alkali metal, ammonium, alkylamine or alkoxyamine salt of a sulphate of a fatty alcohol containing 10 to 20 carbon atoms in the molecule or mixtures thereof and a surface-tension reducer consisting of an alkali metal or ammonium salt of a dialkyl ester of sulpho-succinic acid. The fatty alcohol from which the emulsifying agent is derived may be the same or different from the stabiliser; the preferred surface-tension reducer is the sodium salt of the dioctyl ester of sulpho-succinic acid.

The three terms, "stabiliser," "emulsifying agent" and "surface-tension reducer," are used to make clear the nature of the present invention and do not have a precise scientific connotation as to the function of the three agents. Thus the "surface-tension reducer" may be regarded as influencing the ease with which the emulsion is formed, the "stabiliser" as influencing the keeping properties of the finished polymer emulsion and the "emulsifying agent" as influencing the nature of the interface between the continuous and the dispersed phases. It should be emphasized that the distinctions are by no means clear-cut and that the functions of one of these materials may impinge on those of another.

In order that the objects of our invention may best be achieved, we have found that the concentration of the three agents have to be chosen within certain limits as shown below.

The preferred overall concentration of the three agents combined lies between 0.5 and 2.5% by weight of the polymerisable compound. This concentration is not so critical as the ratio of the agents among themselves.

We have found that the most effective ratios between the three agents are: stabiliser to emulsifying agent, 70±20:30±20, preferably 70:30, and stabiliser and emulsifying agent combined to surface-tension reducer 100±20:25±20, preferably 100:25.

The polymerisation may be effected in the presence of the customary polymerisation catalysts, namely percompounds such as persalts and peroxides, under the influence of heat and/or actinic light.

The catalyst may be one which is soluble in the aqueous phase, for example, ammonium persulphate or hydrogen peroxide, or in the disperse phase, for example, benzyl peroxide. The emulsion may be formed before polymerisation is started and subsequently polymerised statically or the emulsion may continuously be re-formed by stirring or other means during the polymerisation.

Other agents may be added, as for example, small concentrations of inorganic salts as buffer salts or small concentrations of aldehydes, such as acetaldehyde, as controlling agents, as already known in the art.

The following examples illustrate the manner in which the invention may be carried into effect:

*Example 1.*—An aqueous phase was made up by dissolving 0.5 g. of the sodium salt of the dioctyl ester of sulpho-succinic acid, 0.6 g. of the sodium salt of sulphated cetyl alcohol and 1.4 g. of cetyl alcohol in 200 ccs. of distilled water. When solution of these agents was complete, 1.5 g. of ammonium persulphate and 0.01 g. sodium bicarbonate were added. This aqueous phase was then used for the emulsification of 200 ccs. of vinyl acetate. Emulsification was achieved in a hand-operated emulsifying machine. The polymerisation was carried out in a 500 cc. flask, fitted with stirrer and reflux condenser, and which was immersed in a water-bath maintained at a temperature of 60° C. and the emulsion was well stirred during the polymerisation. After 6 hours the polymerisation was found to be complete. The polymer emulsion was a free-flowing, milky-white liquid having a pH of 4.0 and containing 47.3% by weight polyvinyl acetate. This emulsion was stable for a period of several months. When left to evaporate on a glass plate, the emulsion deposited a tough, continuous and nearly transparent film.

*Example 2.*—1 g. of stearyl alcohol, 0.4 g. of the ammonium salt of sulphated lauryl alcohol and 0.2 g. of the sodium salt of the dioctyl ester of sulpho-succinic acid, were heated in 100 ccs. of distilled water until the stearyl alcohol was dissolved. When this solution had cooled, 100 g. of methyl acrylate containing 0.15% by weight of crotonyl peroxide were admixed and the whole was emulsified in a hand-operated emulsifying machine. The emulsion was heated to 65° C. in a glass flask fitted with a slow speed stirrer. After 12 hours, polymerisation was complete, the polymer emulsion being a free-flowing milky liquid, giving, on evaporation, a tough flexible film. The particle size of the particles of the polymer in the emulsion was of the order of 0.3 to 0.7μ. After storing for several weeks, the polymer emulsion did not show any signs of sedimentation.

What we claim is:

1. A process for the production of polymer emulsions which comprises dispersing a polymerizable monomeric material selected from the group consisting of a vinyl ester of an aliphatic acid and an aliphatic saturated monohydric alcohol ester of acrylic acid in an aqueous medium containing a fatty alcohol containing 10 to 20 carbon atoms in the molecule as an emulsion stabilizer, an emulsifying agent of the class consisting of the alkali metal, ammonium, alkylamine and alkoxyamine salts of sulphated fatty alcohols which contain 10 to 20 carbon atoms in the molecule and a surface-tension reducer of the class consisting of the alkali metal and ammonium salts of dialkyl esters of sulpho-succinic acid the ratio of said emulsion stabiliser to said emulsifying agent lying in the range between 9 to 1 and 1 to 1 and the ratio of the combined amounts of said emulsion stabiliser and emulsifying agent to said surface tension reducer lying in the range between 24 to 1 and 1.78 to 1 and polymerizing said monomeric material.

2. A process according to claim 1 wherein the overall concentration of the emulsion stabiliser, emulsifying agent and surface-tension reducer combined is between 0.5% and 2.5% by weight of the said monomeric vinyl ester.

3. A process for the production of stable emulsions of polymerised esters which comprises dispersing vinyl acetate in an equal volume of an aqueous medium containing the sodium salt of the dioctyl ester of sulpho-succinic acid, cetyl alcohol and the sodium salt of sulphated cetyl alcohol the ratio of said cetyl alcohol to said salt of sulphated cetyl alcohol being in the range between 9 to 1 and 1 to 1 and the ratio of the combined alcohol and sodium salt of said alcohol to said salt of said sulpho-succinic acid being in the range between 24 to 1 and 1.78 to 1", the amounts of said sodium salts and of the cetyl alcohol combined being between 0.5% and 2.5% by weight of said vinyl acetate and polymerising the emulsified vinyl acetate by the action of heat in the presence of a percompound catalyst and a trace of sodium bicarbonate.

4. A process according to claim 1, wherein the monomeric vinyl ester of an aliphatic acid employed is vinyl acetate.

5. A process for the production of stable emulsions of polymerised esters which comprises dispersing methyl acrylate in a substantially equal volume of an aqueous medium containing the sodium salt of the dioctyl ester of sulpho-succinic acid, stearyl alcohol and the ammonium salt of sulphated lauryl alcohol, the ratio of said stearyl alcohol to said salt of said sulphated lauryl alcohol being in the range between 9 to 1 and 1 to 1 and the ratio of the combined alcohol and salt of said alcohol to said salt of said sulpho-succinic acid being in the range between 24 to 1 and 1.78 to 1, the amounts of said salts and of the stearyl alcohol combined being between 0.5% and 2.5% by weight of said methyl acrylate, and polymerising the emulsified methyl acrylate by the action of heat in the presence of a percompound catalyst.

JOHANN JOSEF PETER STAUDINGER.
DESMOND CLEVERDON.

REFERENCES CITED

The following references are of record in the file of this patent:

UNITED STATES PATENTS

| Number | Name | Date |
|---|---|---|
| 2,404,791 | Coffman | July 30, 1946 |
| 2,408,690 | Seymour | Oct. 1, 1946 |
| 2,443,735 | Kropa | June 22, 1948 |
| 2,443,893 | Collins | June 22, 1948 |
| 2,473,929 | Wilson | June 21, 1949 |